United States Patent Office  3,124,511
Patented Mar. 10, 1964

3,124,511
DIAGNOSTIC TEST FOR HOG CHOLERA
Robert L. Taylor and Fred Zuschek, Des Moines, Iowa, assignors, by mesne assignments, to Diamond Laboratories Inc., Des Moines, Iowa
No Drawing. Filed July 7, 1961, Ser. No. 122,424
7 Claims. (Cl. 167—84.5)

The present invention relates to diagnostic tests for hog cholera.

A simple laboratory test for the diagnosis of hog cholera is essential for better control of this disease. Present methods utilizing swine inoculation tests are expensive and time-consuming. Due to the severity of the disease all conditions, even faintly resembling hog cholera, must be treated as such. This results in added expense and confuses the diagnosis where hog cholera is not involved.

Accordingly, it is an object of the present invention to devise a simple diagnostic test for hog cholera.

Another object is to devise a test for hog cholera which is specific or substantially specific for this disease.

A further object is to devise a test for hog cholera that can be performed in the field by a veterinarian.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by tests which indicate the impairment of pancreatic enzymatic activity of the hog.

PREPARATION OF PANCREATIC EXTRACT

A portion of a hog pancreas weighing approximately 5 grams was removed from the anterior half of the gland and placed in a sterile petri dish. The tissue was minced with scissors and placed in a small bottle containing 10 ml. of physiological saline solution. The mince was shaken and clumps of tissue were allowed to settle. Only supernatant fluid was used in the tests. Extracts of normal hog pancreas were tested simultaneously with extracts of hog cholera infected hog pancreas to serve as controls.

Test 1

This was a hemolysis test. Three drops of the pancreatic extract, three drops of physiological saline solution and three drops of rabbit red blood cells (prepared as set forth below) were mixed in a Wasserman tube.

The rabbit red blood cells were obtained by cardiac puncture from a healthy mature rabbit. The blood obtained was mixed at a 1:1 ratio by volume with Alsevers solution. (Alsevers solution is composed of Dextrose _____ gm__ 41.00
Na citrate_____ gm__ 16.00
Na chloride_____ gm__ 8.40
Distill H₂O_____ ml__ 2,000.00
Citric acid_____ gm__ 1.10 to be sterilized at 10 pounds for 20 minutes.) This mixture was diluted 1:10 by volume in physiological saline solution as the red blood cells were needed.

The fluid mixture in the Wasserman tube was agitated in a water bath at 40° C. for two hours, and observed for hemolysis.

Extracts of normal hog pancreas hemolyzed the red blood cells, usually within 1 hour. However, the pancreatic extracts from hog cholera infected pigs did not hemolyze the red blood cells. Instead, a round button formed at the bottom of the tube due to the settling of the red blood cells. The fluid in the tube remained clear. In contrast the red blood cells treated with extracts of normal hog pancreas had a diffuse color due to the hemolysis and had no button at the bottom of the tube.

In place of using red blood cells of a rabbit there can be utilized swine red blood cells with equal effect. Results with chicken red blood cells and bovine cells were erratic.

Test 2

Three drops of pancreatic extract were mixed with 3 ml. of a 1% soluble starch solution in a test tube, incubated in a water bath at 40° C. for 5 minutes, and then one drop of iodine solution added. (The iodine solution was prepared by dissolving 5.5 grams of iodine crystals and 11.0 grams of potassium iodide in 250 ml. of water.) The solutions were mixed thoroughly and the color observed. Extract from the pancreas of normal pigs produced a pale yellow color in the amylase test indicating decomposition of starch by amylase present in the pancreatic extract. Pancreatic extracts obtained from pigs infected with hog cholera produced a dark blue or purple color due to the presence of starch and lack of its decomposition.

In this test heating can also be accomplished by warm tap water or a hot air register. If the temperature is varied, the time of heating should also be varied to compensate for the slower action of the amylase. The pancreatic extracts from hog cholera infected pigs do not decompose starch as rapidly as the pancreatic extracts of uninfected pigs.

Results obtained with the hemolysis and amylase tests using pancreas from unvaccinated, vaccinated and hog cholera infected hogs are shown in Table 1:

TABLE 1

| Type of Hog | Number Having Pancreas Showing Activity Over Total Number of Hogs Tested | |
|---|---|---|
| | Hemolytic Activity | Amylase Activity |
| Hyperimmune | 19/20 | 10/10 |
| Normal unvaccinated | 5/5 | 5/5 |
| Normal from Slaughterhouse | 10/10 | 14/15 |
| Infected with Virulent Virus | 0/30 | 0/20 |

The hyperimmune hogs were immune hogs given large doses of virulent virus for the production of hyperimmune hog cholera antiserum. The infected hogs were those used for production of hog cholera virus and inoculated with virus six days before sacrificing.

The hemolysis test is the more sensitive under the conditions employed in our work. This was determined by challenging normal hogs with virulent hog cholera virus and sacrificing one on each day after challenge.

The results are shown in Table 2.

TABLE 2

| Test | Reaction on Post Infection Days | | | | | | |
|---|---|---|---|---|---|---|---|
| | 0 | 1 | 2 | 3 | 4 | 5 | 6 |
| Hemolysis | + | + | + | − | − | − | − |
| Amylase | + | + | + | + | ± | − | − |
| Febrile above 104° F | − | − | − | + | + | + | + |

An absence of hemolysis of red blood cells was noted 3 days after infection with virulent virus. However, a definite diminishing of amylase activity did not occur until 5 days after infection. Starting on the third day, progressively darker shades were produced until a deep blue color occurred at 5 days. By varying the concentration of the test reagents in the amylase test it can be made more sensitive.

Both the hemolytic test and the amylase test are simple to perform and can be used for example in herd diagnosis.

We have also determined that a diagnosis of hog cholera may be made by tests which indicate a differential in the enzymatic activity of the pancreas of a pig as between hog cholera, other diseases, and normal pigs. The tests used in this regard with pancreas from field cases was as follows:

Table 3

Mince 5 grams of pancreas and add to 10 ml. of saline. Make 10 fold dilutions of this original solution. Add two drops of each dilution to 3 ml. of 1% starch and incubate for 30 minutes in a water bath at 40° C. Add 1 drop of iodine solution: + indicates a dark blue or purple color due to the presence of starch and indicating impairment of pancreatic enzymatic activity; − indicates a yellow color due to the decomposition of starch and hence its absence, and further indicating the lack of or insignificant impairment of pancreatic enzymatic activity.

| Sample | Clinical Diagnosis | Dilution of Pancreas | |
|---|---|---|---|
| | | 1/10 | 1/100 |
| 1 | Hog Cholera | + | + |
| 2 | do | + | + |
| 3 | Erysipelas | − | − |
| 4 | Enterotoxemia | − | − |
| 5 | Hemorrhagic Dysentry | − | − |
| 6 | Streptococcus | − | − |
| 7 | Gut Edema | − | − |
| 8 | Hog Cholera | + | + |

The preceding process was also used in testing pancreas from experimentally infected animals and the method was the same except that 1 ml. of each dilution was added to 3 cc. of 1% starch. All infected animals were killed in a moribund condition. The results of such tests were:

TABLE 4

| Sample | Animal Acutely Infected With— | Dilution of Pancreas 1/10 |
|---|---|---|
| 1 | Salmonella sp | − |
| 2 | do | − |
| 3 | Erysipelothrix rhus | − |
| 4 | do | − |
| 5 | do | − |
| 6 | Normal Control | − |
| 7 | do | − |
| 8 | Hog Cholera | + |
| 9 | do | + |

What is claimed is:

1. A method of determining whether a pig had hog cholera comprising determining the pancreatic activity of the pig and comparing it with the impared pancreatic activity of a pig known to have hog cholera.

2. A method of determining whether a pig had hog cholera comprising mixing a pancreatic extract of the pig, said pancreatic extract having been prepared by mincing the anterior half of the pancreas of the pig and removing the tissue from the mince, with the red cells of a pig and observing whether a settling of the blood without hemolysis occurs.

3. A method of determining whether a pig had hog cholera comprising mixing a pancreatic extract of the pig, said pancreatic extract having been prepared by mincing the anterior half of the pancreas of the pig and removing the tissue from the mince, with the red cells of a rabbit and observing whether a settling of the blood without hemolysis occurs.

4. A method of determining whether a pig had hog cholera comprising testing a pancreatic extract of the pig, said pancreatic extract having been prepared by mincing the anterior half of the pancreas of the pig and removing the tissue from the mince, for impaired amylase activity.

5. A method of determining whether a pig had hog cholera comprising testing a pancreatic extract of the pig, said pancreatic extract having been prepared by mincing the anterior half of the pancreas of the pig and removing the tissue from the mince, for impaired enzymatic activity.

6. A method of determining whether a pig had hog cholera comprising mixing a pancreatic extract of the pig, said pancreatic extract having been prepared by mincing the anterior half of the pancreas of the pig and removing the tissue from the mince, with a mixture of starch solution and iodine and observing whether a dark blue to purple color is formed.

7. A method according to claim 5 wherein the resulting mixture is heated at 40° C. for 5 minutes.

References Cited in the file of this patent

UNITED STATES PATENTS

| 642,329 | Higgins | Jan. 30, 1900 |
| 1,916,872 | Wachman et al. | July 4, 1933 |
| 2,738,305 | Lohmar et al. | Mar. 13, 1956 |
| 2,981,606 | Keston | Apr. 25, 1961 |
| 2,999,792 | Segre | Sept. 12, 1961 |
| 3,014,843 | Baker | Dec. 26, 1961 |
| 3,029,192 | Krebs | Apr. 10, 1962 |

OTHER REFERENCES

Wroblewski, F. (I): Symposium on Diagnostic Enzymology, The American Journal of Medicine, vol. 27, No. 6, pp. 849–874, 911–923, December 1959.

Wroblewski et al. (III): "Isoenzymes and Myocardial Infarction," New England Journal of Medicine, vol. 263, No. 11, pp. 531–536, Sept. 15, 1960.

Wroblewski, F. (II): "Serum Enzyme Alterations in Diseases of the Liver and Biliary Tract," Med. Clin. N. Amer., vol. 44, pp. 699–708, May 1960.

Kove, S., et al. (II): "Serum Transaminase as an Aid in Early Diagnosis of Congenital Biliary Atresia," Amer. J. Med. Sci., vol. 240, pp. 353–360, September 1960.

Kove, S., et al. (I): "Diagnosis of Neonatal Jaundice by Patterns of Serum Transaminase," AMA J. Dis. Child, vol. 100, pp. 47–68, July 1960.

Cramer, F. D.: "Inclusion Compounds," Reviews of Pure and Applied Chemistry, vol. 5, No. 3, pp. 143–164, September 1955.

Millian et al.: "Application of the Conglutination Complement Absorption Test to Detect Hog Cholera Anti- (Other references on following page)

bodies I. The Technique," Am. J. Vet. Res., vol. 22, pp. 396–400, May 1961.

Rapp: "Normal Values for Serum Amylase and Maltase in Dogs and the Effect of Maltase on the Saccharogenic Method of Determining Amylase in Serum," Amer. J. Vet. Res., vol. 23, pp. 343–350, March 1962. (Received for publication May 4, 1961.)

Higginbotham et al.: "The Estimation of Amylose in the Presence of Amylopectin," Journal of the Textile Institute, pp. T201–T207, April 1949.

Lampitt et al.: "Starches and Starch Fractions. Part III. The Intensity of the Colour of Starch Iodine-Iodide Solutions as an Index of the Amylose-Amylopectin Ratio," J.S.C.T., vol. 66, pp. 142–147, May 1947.

Bates et al.: "Amylose and Amylopectin Content of Starches Determined by Their Iodine Complex Formation," J. Am. Chem. Soc., vol. 65, pp. 142–148, February 1943.

Sherman et al.: "Experiments Upon Starch as Substrate for Enzymatic Action," J. Am. Chem. Soc., vol. 38, pp. 1885–1904, 1916.

Taylor: "New Laboratory Tests for Hog Cholera Diagnosis," Veterinary Medicine, vol. 56, pp. 229–232, June 1961.